US010338677B2

(12) United States Patent
Guenter (10) Patent No.: US 10,338,677 B2
(45) Date of Patent: Jul. 2, 2019

(54) ADJUSTING IMAGE FRAMES BASED ON TRACKING MOTION OF EYES

(71) Applicant: Microsoft Technology Licensing, LLC, Redmond, WA (US)

(72) Inventor: Brian K. Guenter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 14/925,892

(22) Filed: Oct. 28, 2015

(65) Prior Publication Data

US 2017/0123489 A1    May 4, 2017

(51) Int. Cl.
| | |
|---|---|
| *G06F 3/01* | (2006.01) |
| *G06T 19/00* | (2011.01) |
| *G02B 27/01* | (2006.01) |
| *H04N 7/18* | (2006.01) |
| *A63F 13/213* | (2014.01) |
| *A63F 13/5255* | (2014.01) |
| *G06F 3/03* | (2006.01) |

(52) U.S. Cl.
CPC ............ *G06F 3/013* (2013.01); *A63F 13/213* (2014.09); *A63F 13/5255* (2014.09); *G02B 27/017* (2013.01); *G02B 27/0172* (2013.01); *G06F 3/0304* (2013.01); *G06T 19/006* (2013.01); *H04N 7/183* (2013.01); *G02B 2027/014* (2013.01); *G02B 2027/0112* (2013.01); *G02B 2027/0138* (2013.01); *G02B 2027/0187* (2013.01)

(58) Field of Classification Search
CPC .... G02B 2027/0112; G02B 2027/0138; G02B 2027/014; G02B 27/0172; G06F 3/013; G06T 19/006; H04N 7/183

USPC ........................................................... 348/78
See application file for complete search history.

(56) References Cited

U.S. PATENT DOCUMENTS

| | | | |
|---|---|---|---|
| 5,446,834 | A | 8/1995 | Deering |
| 5,684,498 | A | 11/1997 | Welch et al. |

(Continued)

FOREIGN PATENT DOCUMENTS

| | | |
|---|---|---|
| EP | 2447757 A1 | 5/2012 |
| EP | 2696259 A1 | 2/2014 |

(Continued)

OTHER PUBLICATIONS

Mantiuk, et al., "Gaze-driven Object Tracking for Real Time Rendering", In Computer Graphics Forum, vol. 32, Iss. 2, pt2, May 1, 2013, 11 Pages.

(Continued)

*Primary Examiner* — Francis Geroleo
(74) *Attorney, Agent, or Firm* — Schwegman Lundberg & Woessner, P.A.

(57) ABSTRACT

In some examples, techniques and architectures for operating a device that may be wearable, such as a head-mounted device, may be used for virtual reality applications. A processor of the device may operate by dynamically tracking the cornea, and thus the gaze direction, of a user's eyes. By tracking the gaze direction, retinal velocity of a display image projected onto the retina, measured in the retina coordinate frame may be computed. Display times of image frames viewable by the user may be modified based on the retinal velocity.

20 Claims, 6 Drawing Sheets

(56) References Cited

U.S. PATENT DOCUMENTS

| | | | |
|---|---|---|---|
| 7,019,736 | B2 | 3/2006 | Allen et al. |
| 7,542,210 | B2 | 6/2009 | Chirieleison, Sr. |
| 7,593,026 | B2 | 9/2009 | Turner |
| 8,115,776 | B2 | 2/2012 | Selbrede et al. |
| 8,184,133 | B2 | 5/2012 | Morvan et al. |
| 8,279,138 | B1 | 10/2012 | Margulis |
| 8,294,633 | B2 | 10/2012 | Cernasov |
| 8,487,838 | B2 | 7/2013 | Lewis et al. |
| 8,581,923 | B2 | 11/2013 | Kerofsky |
| 8,611,015 | B2 | 12/2013 | Wheeler et al. |
| 8,773,480 | B2 | 7/2014 | Van Ostrand et al. |
| 8,824,779 | B1 * | 9/2014 | Smyth .................. G06K 9/0061 382/100 |
| 8,842,064 | B2 | 9/2014 | Robinson |
| 8,866,833 | B2 | 10/2014 | Petersen et al. |
| 8,971,570 | B1 * | 3/2015 | Raffle ................ G06K 9/00604 382/103 |
| 2010/0220975 | A1 | 9/2010 | Kondo et al. |
| 2011/0018903 | A1 | 1/2011 | Lapstun et al. |
| 2013/0106674 | A1 | 5/2013 | Wheeler et al. |
| 2014/0362446 | A1 | 12/2014 | Bickerstaff et al. |
| 2014/0375683 | A1 * | 12/2014 | Salter ..................... G06F 3/013 345/633 |
| 2015/0035744 | A1 | 2/2015 | Robbins et al. |
| 2015/0097772 | A1 * | 4/2015 | Starner ................... G06F 3/013 345/158 |
| 2015/0324568 | A1 * | 11/2015 | Publicover ......... H04N 5/23229 726/19 |
| 2015/0338915 | A1 * | 11/2015 | Publicover ......... H04N 5/23229 345/633 |
| 2016/0077337 | A1 * | 3/2016 | Raffle ..................... G06F 3/013 345/156 |
| 2016/0085302 | A1 * | 3/2016 | Publicover ......... H04N 5/23229 345/633 |
| 2016/0274659 | A1 * | 9/2016 | Caraffi .................... G06F 3/013 |
| 2017/0068312 | A1 * | 3/2017 | Mallinson .............. G06F 3/013 |

FOREIGN PATENT DOCUMENTS

| | | |
|---|---|---|
| WO | WO2014138925 A1 | 9/2014 |
| WO | WO2015103444 A1 | 7/2015 |

OTHER PUBLICATIONS

PCT Search Report and Written Opinion dated Jan. 13, 2017 for PCT Application No. PCT/US2016/058095, 11 Pages.

Scher Zagier, Ellen J., "A Human's Eye View: Motion Blur and Frameless Rendering", In Crossroads—Special Issue on Computer Graphics, vol. 3, Iss. 4, May 1997, 13 Pages.

Abrash, "My Steam Developers Day Talk", retrieved on Jul. 20, 2015, available at <<http://blogs.valvesoftware.com/author/mabrash/>>, 20 pages.

Ars Technica, "New Oculus prototype features positional tracking, reduced motion blur", retrieved on Jul. 20, 2015, available at <<http://arstechnica.com/gaming/2014/01/new-oculus-prototype-features-positional-tracking-reduced-motion-blur/>>, 4 pages.

Chen, et al., "A Robust 3D Eye Gaze Tracking System using Noise Reduction", in the Proceedings of Symposium on Eye Tracking Research & Applications, Mar. 26, 2008, pp. 189-196.

Chen et al., "Mixed Color Sequential Technique for Reducing Color Breakup and Motion Blur Effects", in the Journal of Display Technology, vol. 3, No. 4, Dec. 2007, 9 pages.

Curatu et al., "Projection-based head-mounted display with eye-tracking capabilities", in the Proceedings of SPIE, vol. 5875, Novel Optical Systems Design and Optimization VIII, Sep. 2005, 9 pages.

Kreylos, "An Eye-tracked Oculus Rift", retrieved on Jul. 16, 2015, available at <<http://doc-ok.org/?p=1021>>, 24 pages.

Li et al., "An Efficient Method for Eye Tracking and Eye-Gazed FOV Estimation", in the Proceedings of the 16ht IEEE International Conference on Image Processing, Nov. 7, 2009, pp. 2597-2600.

MacIntyre et al., "Estimating and Adapting to Registration Errors in Augmented Reality Systems", in the Proceedings of the IEEE 2002 Virtual Reality Conference, Mar. 24, 2002, 9 pages.

Sadri et al., "Particle Filtering in the Design of an Accurate Pupil Tracking System", in the Journal of International Journal of Computer Applications, vol. 51, No. 8, Aug. 2012, pp. 6-11.

Vaissie et al., "Analysis of eyepoint locations and accuracy of rendered depth in binocular head-mounted displays", in the Proceedings of Conference on Stereoscopic Displays and Applications, Jan. 1999, pp. 57-64.

* cited by examiner

CAPTURE IMAGES OF A CORNEA OF AN EYE OF A SUBJECT WHILE THE SUBJECT GAZES AT A DISPLAY DEVICE, WHEREIN THE CAPTURED IMAGES INCLUDE SETS OF GLINT POINTS PRODUCED BY SPECULAR REFLECTION OF LIGHT BY A SURFACE OF THE CORNEA
902

DETERMINE, BASED AT LEAST IN PART ON A SERIES OF THE CAPTURED IMAGES, IF THE CORNEA IS MOVING IN A SACCADIC MOTION OR IS MOVING SUBSTANTIALLY CONTINUOUSLY
904

ADJUST DURATIONS OF DISPLAY FRAMES DISPLAYED ON THE DISPLAY DEVICE BASED, AT LEAST IN PART, ON WHETHER THE CORNEA IS MOVING IN THE SACCADIC MOTION OR MOVING SUBSTANTIALLY CONTINUOUSLY
906

FIG. 9

ADJUSTING IMAGE FRAMES BASED ON TRACKING MOTION OF EYES

BACKGROUND

Head-mounted devices, which may include helmets, goggles, glasses, or other configurations mountable onto a user's head, generally incorporate display and computer functionality. Head-mounted devices may provide an enhanced viewing experience for multimedia, which may be applied to training, work activities, recreation, entertainment, daily activities, playing games, or watching movies, just to name a few examples.

Head-mounted devices may track a user's head position to enable a realistic presentation of 3D scenes through the use of motion parallax, for example. Knowing the position of the user's head relative to the display, a processor of the head-mounted device may change displayed views of 3D virtual objects and scenes. Accordingly, a user may observe and inspect virtual 3D objects and scenes in a natural way as the head-mounted device reproduces the way the user sees physical objects. Unfortunately, an image or video of objects and scenes may be blurred or include undesirable color artifacts if the user's gaze direction changes rapidly.

SUMMARY

This disclosure describes, in part, techniques and architectures for operating a device that may be wearable, such as a head-mounted device, which may be used for virtual reality applications. A processor of the device may operate by dynamically tracking the cornea, and thus the gaze direction, of a user's eyes. By tracking the gaze direction, retinal velocity of a display image projected onto the retina, measured in the retina coordinate frame may be computed. Display times of image frames viewable by the user may be modified based on the retinal velocity. Thus, for example, if the eye is tracking a rapidly moving display object, then frame time may be shortened. If the eye is not tracking a display object, then the frame time may be lengthened. In some examples, frame time for an image may be roughly proportional to the velocity of the image as measured on the retina (retinal velocity) of the eye. Thus, if the eye is tracking a display object so that the retinal velocity is substantially zero, then frame time may be short. If the eye is not tracking an object and the retinal velocity is relatively high, then the frame time may be correspondingly longer.

Herein, though examples are directed mostly to wearable devices, devices having similar or the same functionality need not be wearable. For example, dynamic tracking of eye gaze, as described herein, may be performed by a device that may be handheld, mounted on a structure separate from a subject or user, or set on a surface (e.g., tabletop), just to name a few examples. Nevertheless, the term "wearable device" will be used to encompass all such examples.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., FPGAs, application-specific integrated circuits (ASICs), application-specific standard products (ASSPs), system-on-a-chip systems (SOCs), complex programmable logic devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Display systems (whether projection-based or direct-view) that use color-sequential techniques to generate color may exhibit undesirable visual artifacts easily perceived by an observer under certain circumstances. Sequential color displays emit (for example) the red, green, and blue components (e.g., frames) of an image sequentially, rather than simultaneously, with a relatively rapid refresh cycling time. If the frame rate is sufficiently high, and the observer's eyes are not moving or are moving relatively slow relative to an image on the display (e.g., an example of relatively slow retinal velocity), the image perceived may be satisfactory and indistinguishable from video output generated by techniques that segregate colors spatially using red, green, and blue sub-pixels, rather than temporally as is done with sequential color techniques. On the other hand, if the observer's eyes move fairly rapidly relative to an image (e.g., an object or particular portion of the entire image) on the display (e.g., an example of relatively fast retinal velocity caused by rotational motions of the eye in its socket, saccadic motions, translational head motions, etc.), the image perceived may include undesirable artifacts such as blur and/or a rainbow effect. This latter effect may result from the displayed images' component primary colors (red, green, and blue, for example) arriving at the observer's retina at different times. This may occur, for example, if the eye is not tracking the image. Even at a high frame rate of 60 frames per second, for a particular numerical example, the red, green, and blue information from the display may arrive at the retina 5.5 milliseconds apart. In such a case, an image that is gray in actual color, for example, may split into its separate red, green, and blue components. The faster the eye moves, the more severe the rainbow effect or "image breakup."

In various examples, techniques and architectures may be used to determine or track the position and/or orientation of one or both eyes of a user of a wearable device so as to compute retinal velocity of the eye(s). In some examples, a system need not fully track the position and/or orientation of the eyes, but may collect enough information about the position and/or orientation of the eyes so as to be able to compute retinal velocity. Herein, retinal velocity is the velocity of an image as measured on the retina. In other words, retinal velocity is the velocity of an image projected onto the retina, measured in the retinal coordinate frame. Timing of displayed image frames observable to the user may be modified based, at least in part, on the determined retinal velocity (e.g., or eye position(s) and/or orientation(s). In some examples, a device need not be wearable and the device may be associated with a subject (e.g., a human or animal), and not be limited to a user of the device. Examples of a wearable device may include a display device worn on a user's head or as part of a helmet, and may include position and/or motion sensors to measure inertial position or orientation of the wearable device. The display device may comprise a small display in front of one eye, each eye, or both eyes. The display devices may include CRTs, LCDs, Liquid crystal on silicon (LCOS), or OLED, just to name a few examples.

A wearable device may display a computer-generated image, referred to as a virtual image. For example, a processor of the wearable device may render and display a synthetic (virtual) scene that includes synthetic objects so that the viewer (wearer of the wearable device) perceives the scene as reality (or augmented reality). To do this correctly, the processor may use relatively precise geometric measurements of the positional relationship between the wearable device display and the viewer's gaze, so that the processor may correctly place and orient virtual cameras in the synthetic scene. Such a positional relationship may change continuously or from time to time as the cornea of the viewer (and/or the head of the viewer) move or shift position. If the processor uses inaccurate positional relationship information, the processor may render virtual scenes that appear to tilt and distort unnaturally.

In some examples, a wearable device is configured to track the 3D location of the cornea of the eye. Such tracking is in addition to tracking the direction of a gaze (e.g., direction of looking) Thus, for example, the 3D location of the cornea or other portion of an eye includes the position of the cornea or other portion of the eye relative to each of three spatial axes, x, y, and z. Such a position may be relative to a portion of the wearable device, though claimed subject matter is not so limited.

In some examples, 3D tracking information of the cornea or other portion of the user's eye(s) may be continuously provided to a processor that renders images for the wearable device. Thus, the processor may render images that account for relative motion or the retinal velocity of the user's eye(s) relative to the wearable device. In some implementations, 2D tracking may similarly be provided to a processor, where 2D tracking measures rotation or lateral movement of the cornea. 2D tracking may lead to determining retinal velocity, rate of rotation, or rate of change of gaze direction of the eyes. Such a rate determination may allow a system to detect if the eyes are experiencing saccadic motion, for example.

3D (or 2D) tracking techniques described herein may provide a number of benefits. For example, 3D tracking may be performed dynamically as the user's eyes move (or are still) relative to the wearable device. Thus, a discrete calibration process involving the user is not necessary for beginning operations of the wearable device. Another benefit is that 3D tracking techniques described herein may operate by utilizing light emitters that produce relatively low intensity spots of light (e.g., glints) on the surface of the eye. Accordingly, the light emitters may operate on relatively low power, which may allow for operating a portable, battery-operated wearable device. In some examples, motions of the cornea with respect to a location of an object in image frames may be recorded to a memory device. Such recorded information may be utilized by a system at a later time to study gaze patterns with respect to various displayed objects, for example.

In some examples, a wearable device may include one or more light emitters to emit light toward one or both eyes of a user of the wearable device. Such light may be invisible to the user if the light is in the infrared portion of the electromagnetic spectrum, for example. The light impinging on the cornea of the eye(s) may produce a small spot of light, or glint, which is specular reflection of the light from the corneal surface. A camera of the wearable device may capture an image of the cornea of the eye(s) having one or more such glints. A processor of the wearable device may subsequently calculate the center of the cornea based, at least in part, on relative positions of the glints in the image. Calibration of the camera (e.g., location of aperture of camera and image plane) and relative positioning of the emitter(s), as described below, allow for such a calculation.

The camera of the wearable device may be configured to capture multiple images of the cornea as the eye (or gaze) is aligned in various directions. In some examples, the processor of the wearable device may calculate the center of the cornea for each alignment direction. Subsequently, using the position of each of the centers of the cornea, the processor may calculate the center of the eye. In some examples, the processor may calculate, for a particular time, gaze direction of the eye based, at least in part, on the center of the cornea and the center of the eye. Using measurement information regarding dimensions and sizes of the average human eye, location of the cornea of the eye may be determined from the location of other portions of the eye, using offset or other geometric operations. In other examples, the processor may calculate, for a particular time, gaze direction of the eye based, at least in part, on locations of glints relative to one another. Moreover, for an image received by one or both eyes, glints may be used to track the motion of the image on the retina and to calculate retinal velocity of the eyes.

Various examples are described further with reference to FIGS. 1-9.

The wearable device configuration described below constitutes but one example and is not intended to limit the claims to any one particular configuration. Other configurations may be used without departing from the spirit and scope of the claimed subject matter.

Figure 1:
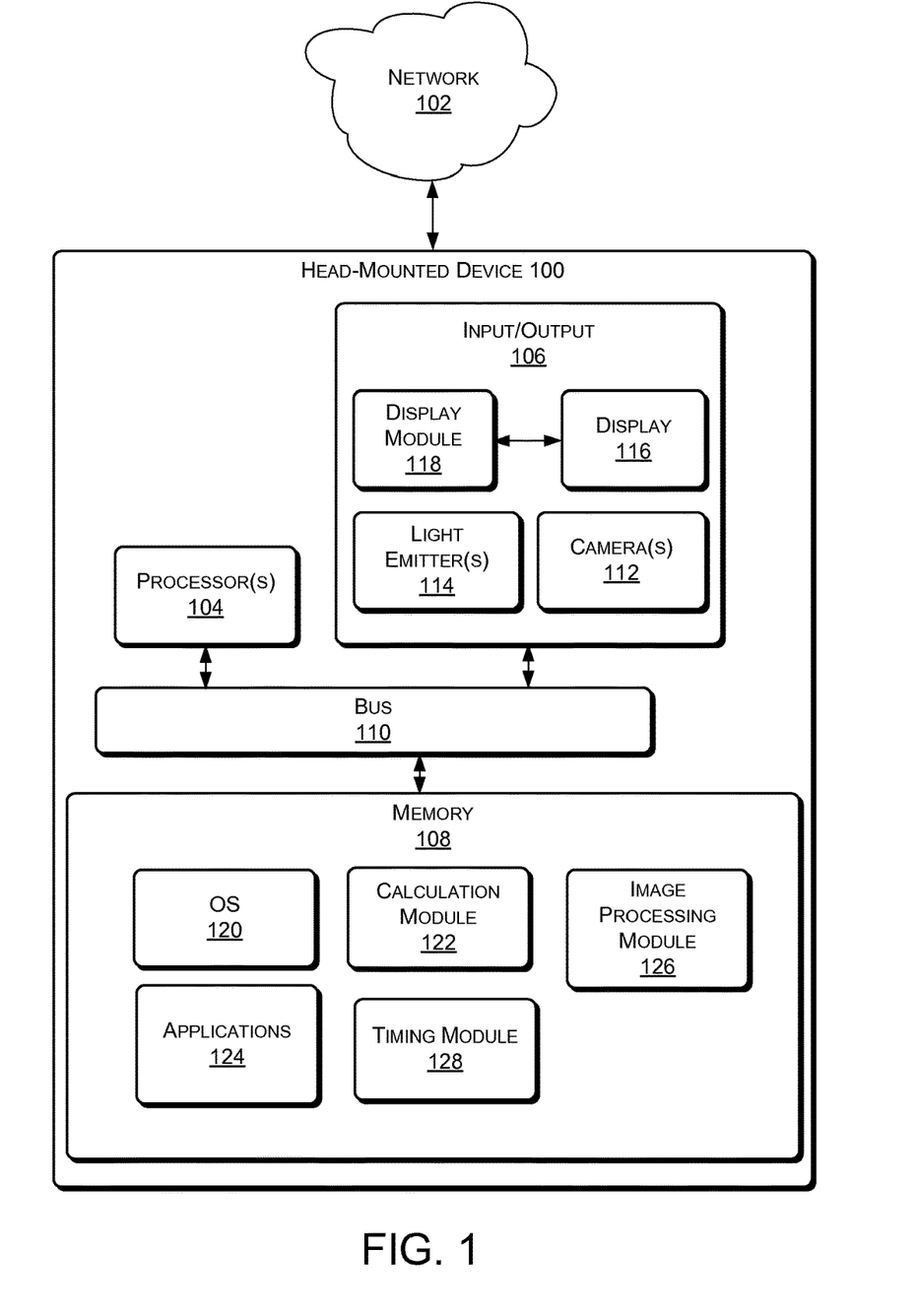
FIG. 1 is a block diagram of an example wearable device.

FIG. 1 illustrates an example configuration for a system 100, which may be a wearable device, in which example processes involving dynamic tracking of eye movement of a user of the system, as described herein, can operate. In some examples, system 100 may be interconnected via a network 102. Such a network may include one or more computing systems that store and/or process information (e.g., data) received from and/or transmitted to system 100.

System 100 may comprise one or multiple processors 104 operably connected to an input/output interface 106 and memory 108, e.g., via a bus 110. In some examples, some or all of the functionality described as being performed by system 100 may be implemented by one or more remote peer computing devices, a remote server or servers, a cloud computing resource, external optical emitters, or external optical detectors or camera(s). Input/output interface 106 may include, among other things, a display device and a network interface for system 100 to communicate with such remote devices.

Input/output device 106 may include camera(s) 112 capable of capturing images and/or video. Input/output module 106 may further incorporate one or more light emitters 114, such as laser diodes, light emitting diodes, or other light generating device. Herein, "light" may refer to any wavelength or wavelength range of the electromagnetic spectrum, including far infrared (FIR), near-infrared (NIR), visible, and ultraviolet (UV) energies.

Input/output device 106 may include a display 116 operable by, and in communication with, a display module 118. Display 112 may comprise any of a number of types of displays, which may enable touch input, such as LCD displays, electrophoretic or electrowetting displays, CRTs, and so on. Claimed subject matter is not limited in this respect.

In some examples, memory 108 may store instructions executable by the processor(s) 104 including an operating system (OS) 120, a calculation module 122, and programs or applications 124 that are loadable and executable by processor(s) 104. Memory 108 may further include an image processing module 126 and a timing module 128. For example, image processing module 126 may be used by processor(s) 104 to operate display module 118, which drives display 116. Timing module 128 may be used by processor(s) 104 to determine display times for display frames of images displayed by display 116. Such determined display times may be implemented display module 118 while operating display 116.

The one or more processors 104 may include one or more central processing units (CPUs), graphics processing units (GPUs), video buffer processors, and so on. In some implementations, calculation module 122, applications 124, image processing module 126, and timing module 128 comprise executable code stored in memory 108 and are executable by processor(s) 104 to collect information, locally or remotely by system 100, via input/output 106. The information may be associated with one or more of applications 124.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Input/output module 106 may further include inertial sensors, compasses, gravitometers, or other position or orientation sensors. Such sensors may allow for tracking position and/or orientation or other movement of the system (and, correspondingly, the wearer's head in the case of system 100 being a wearable device).

Memory 108 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. For example, when executed by processor(s) 104, the computer-executable instructions configure the processor(s) to, among other things, operate camera(s) to capture images of a cornea of an eye of a subject while the subject gazes at a display device, where the captured images include sets of glint points on the cornea produced by specular reflection of light by a surface of the cornea; determine, based at least in part on a series of the captured images, if the cornea is moving in a saccadic motion or is moving substantially continuously; and, using timing module 128, adjust durations of display frames displayed on the display device based, at least in part, on whether the cornea is moving in the saccadic motion or moving substantially continuously In various examples, other input devices (not illustrated) of input/output module 106 can be a direct-touch input device (e.g., a touch screen), an indirect-touch device (e.g., a touch pad), an indirect input device (e.g., a mouse, keyboard, etc.), or another type of non-tactile device, such as an audio input device.

Input/output module 106 may also include interfaces (not illustrated) that allow system 100 to communicate with other devices. Such interfaces may include one or more network interfaces to enable communications between system 100 and other networked devices, such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
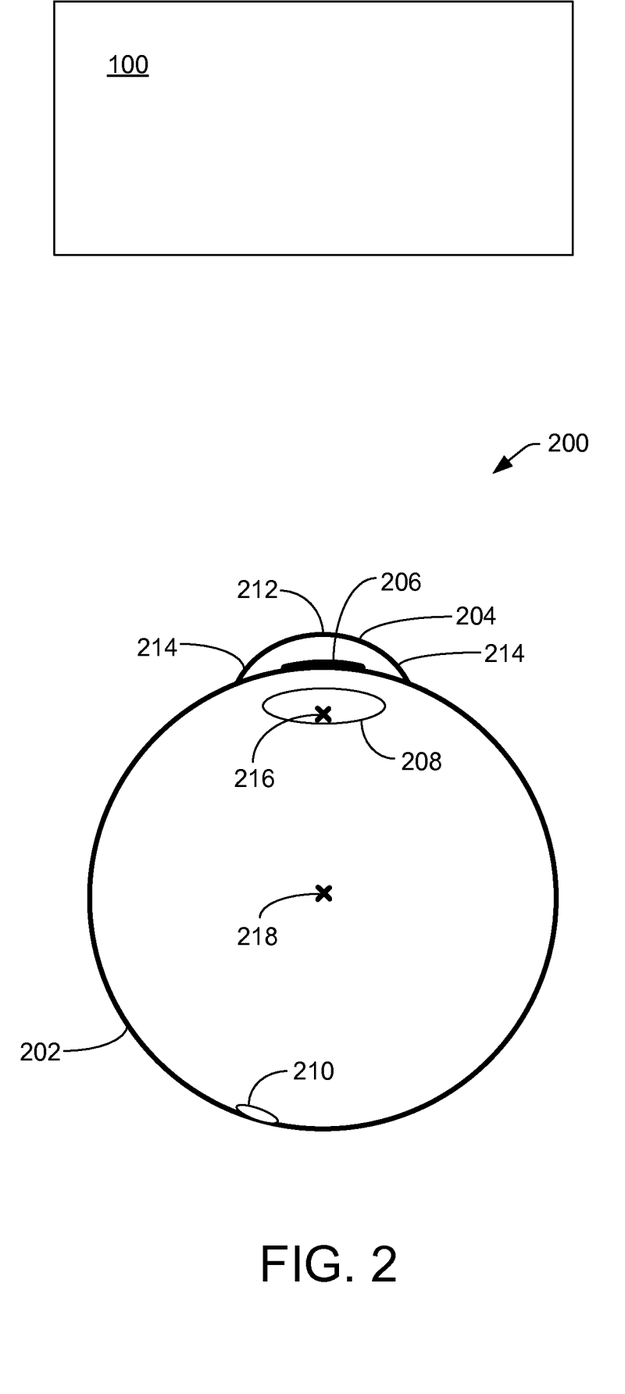
FIG. 2 is a schematic cross-section diagram of an eye of a user of an example wearable device.

FIG. 2 is a schematic cross-section diagram of an eye 200 of a user of a wearable device, such as system 100 described above. Eye 200 represents an average human (or other animal) eye. Eye 200 comprises a substantially spherical eyeball 202 that includes a cornea 204, pupil 206, lens 208, and fovea 210, among other things. A central portion 212 of cornea 204 is substantially spherical, while such sphericity tends to decrease toward peripheral regions 214 of cornea 204. Herein, a corneal sphere refers to a sphere based on the sphericity of cornea 204 around central portion 212. In other words, cornea 204 may be represented by a corneal sphere if the entire cornea were a perfect sphere having spherical parameters set forth by central portion 212. Accordingly, the corneal sphere representing cornea 204 has a center 216 inside eyeball 202.

An optical axis of eye 200 may extend from central portion 212 of the cornea and to fovea 210. Because the fovea may be offset a few degrees on the back of the eyeball, the optical axis may not go through a center 218 of the eyeball. Such an offset may be considered, as described below, if gaze direction of a user is to be determined based, at least in part, on a position of central portion 212 of the cornea.

Figure 3:
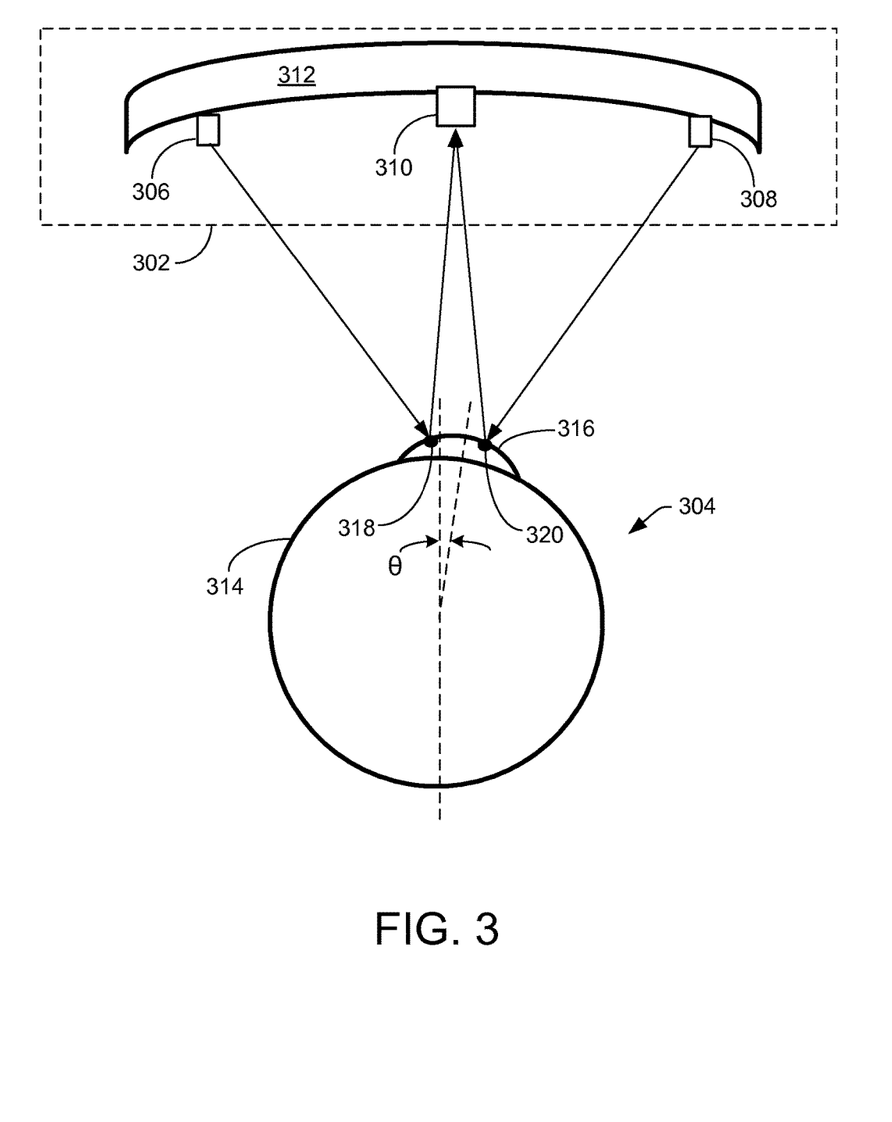
FIG. 3 is a schematic cross-section diagram of a portion of an example wearable device positioned relative to a user's eye.

FIG. 3 is a schematic cross-section diagram of a portion 302 of an example wearable device positioned relative to a user's eye 304. Wearable device portion 302 includes light emitters 306, 308 (e.g., the same as or similar to light emitter(s) 114) and a camera 310 (e.g., the same as or similar to camera(s) 112) mounted or attached in some fashion to a framework 312 of wearable device portion 302. Though two light emitters are described, any number of light emitters may be used in other implementations.

Eye 304 is the same as or similar to eye 200 described above. For example, eye 304 comprises an eyeball 314 that includes a cornea 316, which may be treated as a substantially spherical shape.

Emitters 306, 308 are positioned on wearable device portion 302 so that, as the user is wearing the wearable device, the emitters may direct light onto cornea 316 for a range of rotational positions of eyeball 314. In other words, even as the eyeball rotates (e.g., as the user directs their gaze in different directions as their head position is substantially still) the emitters may shine light onto the surface of the cornea. Rotation of eyeball 314 may be indicated by ⊖. For example, FIG. 3 illustrates light emitter 306 directing light onto the surface of cornea 316 to create a glint 318 and light emitter 308 directing light onto the surface of cornea 316 to create a glint 320. "Glint" refers to a small area (e.g., point) that is a source of light specularly reflected from the surface. In the presently described example, an image of glint 318 created by emitter 306 (and the surface of the cornea) may be captured by camera 310 and an image of glint 320 created by emitter 308 (and the surface of the cornea) may be captured by camera 310. A single image (e.g., "photo") of the cornea captured at a particular time may include both the image of glint 318 and the image of glint 320, as described below.

Emitters 306, 308, camera 310, and eye 304 are positioned relative to one another so that for a particular range of ⊖ (e.g., about 15 to 40 degrees for a particular example) glints on a substantially spherical portion of cornea 316 may be produced by the emitters and images of the glints may be captured by the camera. Beyond such a range, for example, glints in images captured by camera 310 may be on aspherical portions of the cornea or may be on eyeball 314, thus missing the cornea. Such situations are undesirable and may be avoided by judicious relative positioning of the emitters, camera, and expected position of the user's eye(s).

In addition to judicious placement of the emitters and camera relative to expected eye positions, various parameters of the camera may be considered for calibrating the emitter-eye-camera optical system. Such parameters may be focal length of the camera lens, distortion parameters of the optical system of the camera, and position of the center of the image plane of the camera with respect to the emitters(s).

Figure 4:
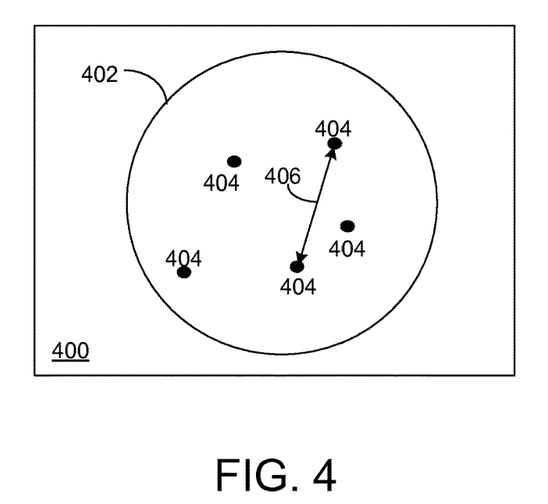
FIG. 4 is an example image of a portion of a cornea of an eye of a user.

FIG. 4 is an example image 400 of a portion 402 of a cornea of an eye of a user. For example, such an image may be captured at a particular time by camera 310 illustrated in FIG. 3. The image of the cornea portion 402 includes a number of glints 404 produced by light from a number of emitters (e.g., emitters 306, 308) impinging on the surface of the cornea. Such glints may represent, in part, a position of the eye with respect to the emitters, the camera, and thus the wearable device upon which the emitters and camera are mounted or attached.

A processor (e.g., processor(s) 104) may perform image analysis on image 400 to determine positions of each glint relative to all other glints. For example, the processor may calculate a distance 406 between two glints 404. In some implementations, particular positions (e.g., x, y, and z positions) of the cornea of the eye (and the eye itself) may lead to unique sets of glint placement on the substantially spherical surface of the cornea. A system (e.g., wearable device) which, among other things, may include emitters and a camera, may capture an image of the cornea as the cornea is oriented in different directions (e.g., as the user of the wearable device shifts their gaze and/or moves their head relative to the wearable device). Each such image may include glints having relative positions that are unique to a particular orientation of the cornea. As described below, the processor of the wearable device may determine and track position(s) and orientation(s) of the user's eye based, at least in part, on relative positions of the glints. For example, for an image received by one or both eyes, glints may be used to track the motion of the image on the retina of the one or both eyes and to calculate their retinal velocity.

In some implementations, to determine or calculate a 3D location of the cornea, the processor may implement an optimization algorithm, which may involve substantially maximizing or minimizing a real function by systematically choosing input values, such as relative locations of glints 404, location of the image place of camera 310, and location(s) of emitter(s). In some examples, optimization may involve finding "best available" values of some objective function given such input values.

Figure 5:
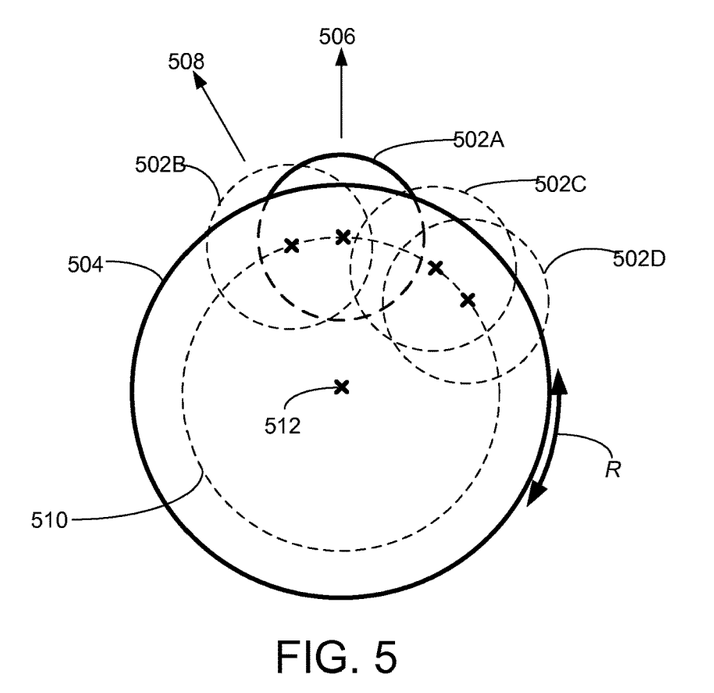
FIG. 5 is a schematic cross-section diagram of virtual corneal spheres superimposed on a sphere representing an eye of a user, according to an example.

FIG. 5 is a schematic cross-section diagram of virtual corneal spheres 502 superimposed on a sphere 504 representing an eye of a user, according to an example. As explained below, a virtual corneal sphere is a representation of a cornea of an eye that may be generated by a processor during a process of determining a gaze direction of an eye. Positions of each virtual cornea sphere 502 correspond to different rotational positions of the cornea and eye as the eye rotates, as indicated by arrow R. For example, virtual corneal sphere 502A corresponds to the eye and gaze looking toward direction 506. Virtual corneal sphere 502B corresponds to the eye and gaze looking toward direction 508.

A processor may generate a virtual corneal sphere based, at least in part, on positional relationships, e.g., a glint pattern, among a set of glints in an image of a cornea. For example, the processor may generate a virtual corneal sphere based on, among other things, geometrical relationships among each of the glint locations, a priori knowledge of the radius of the average human cornea (e.g., about 8.0 millimeters), calibration information regarding the camera capturing the images, and positions of light emitters.

In a particular example, a processor may generate a virtual corneal sphere based on the glint pattern illustrated in image 400 of FIG. 4. In a particular example, an image of the cornea captured when the cornea is oriented toward direction 508 may include a first glint pattern in the image. Subsequently, the processor may use a geometrical relation (e.g., equation) using the first glint pattern as input to generate virtual corneal sphere 502B. A second image, captured when the cornea is oriented toward direction 506, may include a second glint pattern in the second image. Subsequently, the processor may use the second glint pattern to generate virtual corneal sphere 502A.

Each example virtual corneal spheres, 502A, 502B, 502C, and 502D, includes a center. Such centers, indicated by "x" in FIG. 5, lie on a point cloud that forms a virtual sphere 510. As more centers of virtual corneal spheres for different eye orientations are generated by the processor, virtual sphere 510 becomes more populated with the centers. Thus accuracy of subsequent calculations based on the virtual sphere may improve because of the greater number of samples of centers. For example, such calculations may include calculating the center 512 of virtual sphere 510, which substantially corresponds to the center (e.g., 218 in FIG. 2) of the eye.

Figure 6:
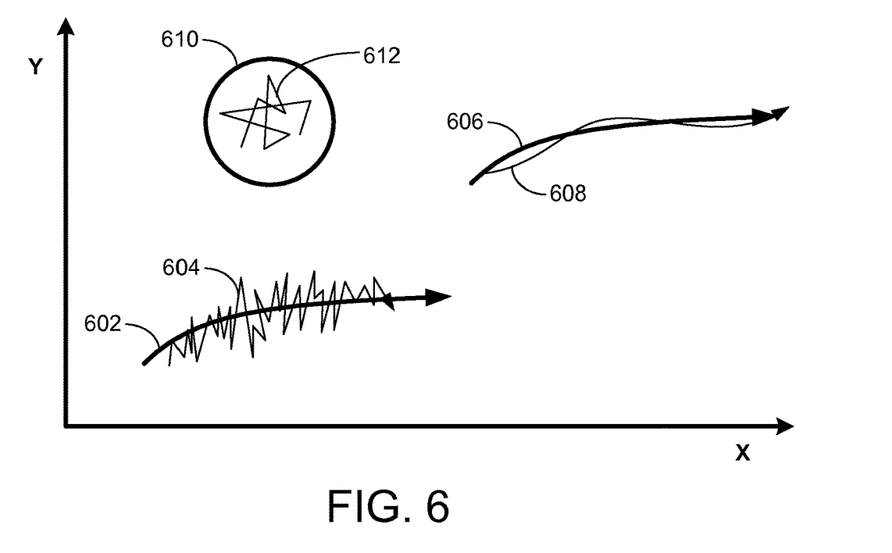
FIG. 6 is a graph of example gaze directions with respect to example objects.

FIG. 6 is a graph of example gaze directions with respect to example objects in an X-Y coordinate system, which represents relative dimensions on a plane (though motion described need not be limited to the plane). For example, such objects may be in a displayed image (e.g., a chair or doorway in a virtual reality image). Gaze directions may be determined in part by saccadic motion, which includes quick movement of both eyes as a user follows a visually moving object or as the user gazes at a fixed object. For example, a first object's movement may be represented by arrow 602. Tracking of a user's gaze direction is represented by trace 604. As the first object moves relatively smoothly and continuously, gaze direction experiences relatively rapid changes that can be described as saccadic motion. This is in contrast to movement of a second object, which is represented by arrow 606. Tracking of a user's gaze direction is represented by trace 608. As the second object moves relatively smoothly and continuously in a "smooth pursuit", so does the user's gaze direction.

A third object 610 is stationary, though gaze direction, represented by trace 612, changes fairly rapidly due in part to saccadic motion. Third object 610, for example, may be a synthetic object in a virtual reality scene displayed on a display device. Though third object 610 may be motionless with respect to the user's head, the user's eyes may continually shift gaze in a probing fashion. If gaze direction changes relatively quickly relative to an image of the virtual reality scene (or if the eyes have a relatively high retinal velocity), the user may observe undesirable effects, such as blurring of the displayed third object 610 or the rainbow effect.

In some examples, tracking gaze direction of an eye, which may result in traces such as 604, 608, and 612, may allow for determination about whether the eye is experiencing saccadic motion or a smooth motion. For example, if a series of measurements of gaze direction of an eye as measured over a period of time include relatively rapid and/or relatively many changes relative to an image on a display, then the eye is likely experiencing saccadic motion. Such a series of gaze direction measurements may be quantified, for example, and compared to empirical data that describes saccadic motion, continuous and smooth motion, and other motion types.

Figure 7:
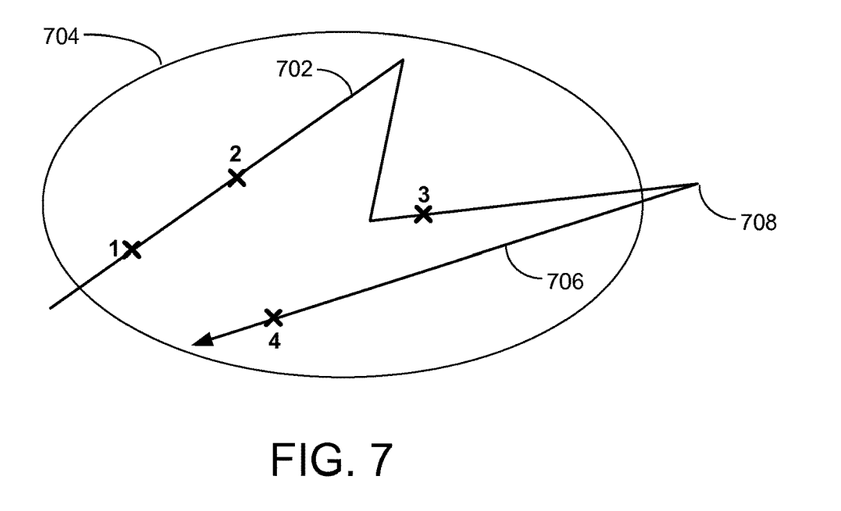
FIG. 7 is a pattern of an example gaze direction of a cornea including example positions corresponding to times when an image of the cornea is captured.

FIG. 7 is a pattern 702 of gaze directions of a cornea of a user including example positions 1-4 corresponding to times when an image of the cornea is captured. Pattern 702 is illustrated as being superimposed on an object 704, at which the user is gazing. Point 1 is the gaze direction at the time when a first image of the user's cornea is captured by a camera. Point 2 is the gaze direction at the time when a second image of the user's cornea is captured by the camera. Point 3 is the gaze direction at the time when a third image of the user's cornea is captured by the camera. Point 4 is the gaze direction at the time when a fourth image of the user's cornea is captured by the camera. Each of the captured images may be the same as or similar to image 400, for example, and include glint patterns on the cornea having relative positions that represent the gaze direction of the user's eye at the time the image was captured. A unique glint pattern captured in an image may exist for each gaze direction of the eye.

Subsequent to calculating gaze directions based, at least in part, on glint patterns, a processor may compare the gaze directions with one another to determine retinal velocity. For example, the retinal velocity between points 1 and 2 may be determined by comparing times that the first and the second images were captured. While images may be captured periodically or from time to time, times between consecutive image captures may be short enough to provide sufficient resolution so that gaze direction is tracked without missing significant parts of the tracking. For example, portion 706 of pattern 702 may not be realized if no images of the cornea were captured between points 3 and 4. In such a case, the greater retinal velocity from point 3 to point 4 through the apex 708 may not be measured. Instead, retinal velocity may be measured as if eye motion is from point 3 directly (e.g., straight line motion) to point 4. Accordingly, to avoid missing portions of a gaze pattern, images of the user's cornea may be captured at faster intervals than are shown in FIG. 7. Such intervals that may be relatively short as compared to retinal velocity. In some implementations, if the processor determines that the eye is experiencing saccadic motions, the processor may adjust (e.g., increase) a frequency of images that are captured by the camera.

Figure 8:
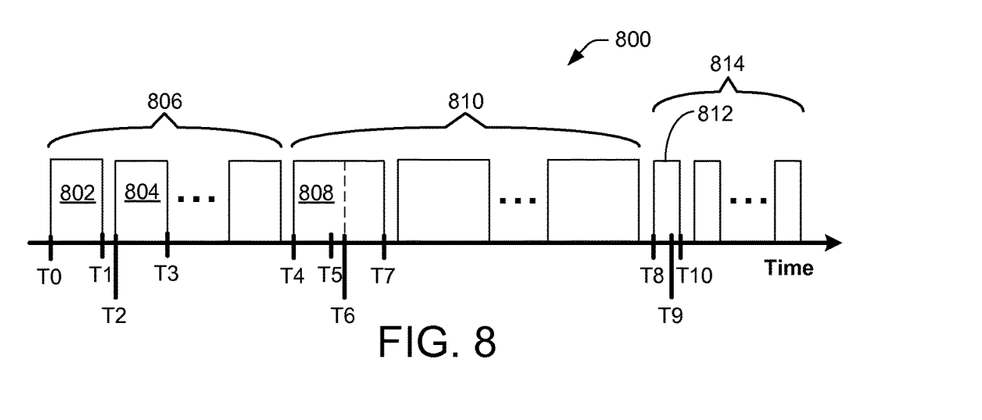
FIG. 8 is a timing diagram of example image frames.

FIG. 8 is a timing diagram 800 of example image frames displayed on a display device of, and by, a system (e.g., system 100) that may include a processor(s), a display module, an image processing module, and a timing module, for example. The waveform (e.g., square wave signal) represents display times of individual image frames. A display time of an image frame is the length of time for which the image frame is displayed on a display device. For video, a series of image frames, each including an image, may be sequentially displayed at about 20-30 image frames per second, just for example. Rates may vary and embodiments are not limited to displaying images at non-varying frame rates.

At a rate of 30 image frames per second, for example, the corresponding display time for each image frame may be up to 1/30=0.033 seconds. In some examples herein, such a display time may be modified based, at least in part, on retinal velocity (e.g., rates of change of gaze direction with respect to an image on the display device) of a user observing video (or any sequence of images).

For an illustrative example, at time T0 a display device begins to display an image frame 802. At time T1 the display device stops displaying image frame 802. Display time for image frame 802 is the time difference between T0 and T1. At time T2 the display device begins to display an image frame 804. At time T3 the display device stops displaying image frame 804. Display time for image frame 804 is the time difference between T2 and T3 which, in this particular example, is the same as the display time for image frame 802. This process may repeat for subsequent image frames, such as a series 806 of image frames that include image frames 802 and 804, which have the display times the same as one another. However, the processor (or other component of the system) may lengthen display times for relatively high retinal velocity or may shorten display times for relatively low retinal velocity.

At time T4, the display device begins to display an image frame 808. At time T5, for example, the system may determine that the user's retinal velocity is relatively low (e.g., below a threshold rate). As a result, the system may extend the display time of image frame 808 beyond a time T6, which is the time that the display device would have stopped displaying image frame 808 if the system had not determined a substantial change in retinal velocity. Accordingly, the system may determine a new display time for image frame 808 (e.g., such a determination may be on the fly). In some examples, the system may update (e.g., based on glint patterns of latest captured image(s)) display time values during the display of image frame 808 (e.g., before the image frame has stopped being displayed). Such an update may be based, at least in part, on new measurements of the user's retinal velocity. Thus, based, at least in part, on updated retinal velocity, the display device stops displaying image frame 808 at time T7. The (new) display time for image frame 808 is the time difference between T4 and T7 which, in this particular example, is greater than the display time for image frames of series 806. The system may display additional image frames, such as the series 810 of image frames, each having display times the same as one another until another change of retinal velocity is determined.

At time T8, the display device begins to display an image frame 812. At time T9, for example, the system may determine that the user's retinal velocity is relatively high (e.g., above a threshold rate). As a result, the system may shorten the display time of image frame 812 relative to the display time of image frames of series 810, which is the display time that would have been applied to image frame 812 if the system had not determined a substantial change in retinal velocity. Accordingly, the system may determine a new display time for image frame 812 (e.g., such a determination may be on the fly). In some examples, the system may update (e.g., based on glint patterns of latest captured image(s)) display time values during the display of image frame 812 (e.g., before the image frame has stopped being displayed). Such an update may be based, at least in part, on new measurements of the user's retinal velocity. Thus, based, at least in part, on updated retinal velocity, the display device stops displaying image frame 812 at time T10. The (new) display time for image frame 812 is the time difference between T8 and T10 which, in this particular example, is less than the display time for image frames of series 806 and series 810. The system may display additional image frames, such as the series 814 of image frames, each having display times the same as one another until another change of the retinal velocity is determined.

Figure 9:
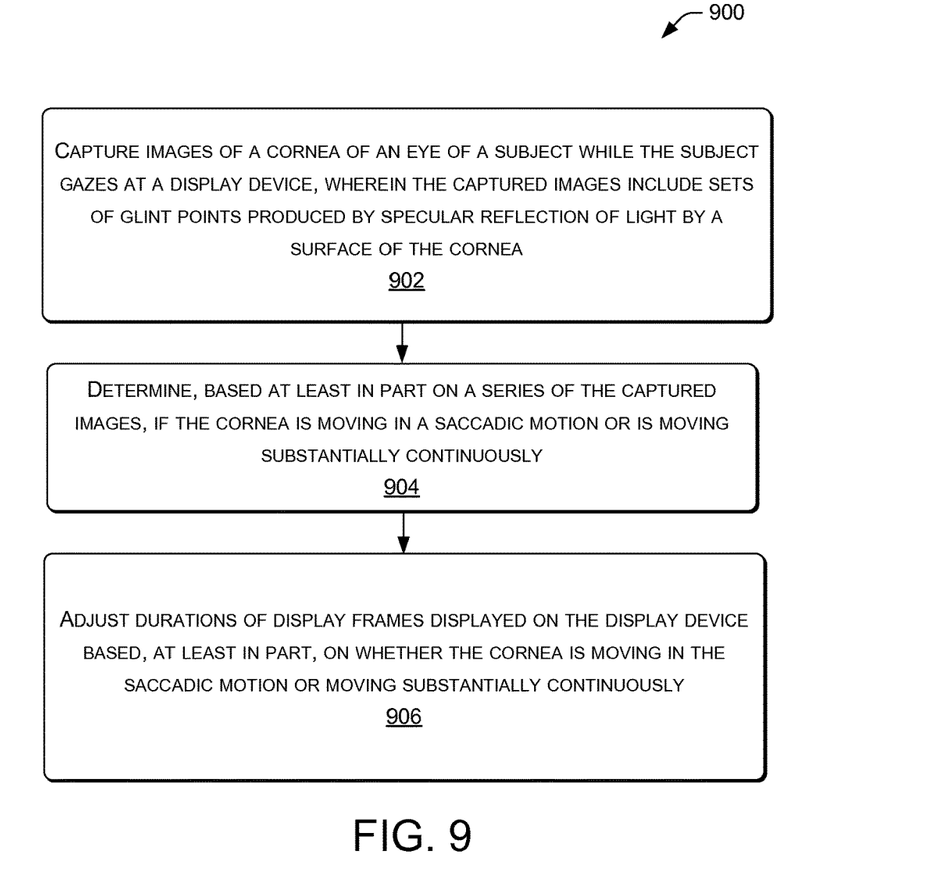
FIG. 9 is a flow diagram of an example process for adjusting durations of display frames based, at least in part, on gaze direction movement of a cornea of an eye of a user.

FIG. 9 is a flow diagram of an example process for adjusting durations of display frames based, at least in part, on gaze direction movement of a cornea of an eye of a user. Process 900 may be performed by system 100 illustrated in FIG. 1, for example.

At block 902, camera 118 may capture images of the cornea of an eye of a subject (e.g., user) of system 100. The images may be captured while the subject gazes at a display device. The captured images may include sets of glint points produced by specular reflection of light by a surface of the cornea.

At block 904, processor(s) 104 may determine, based at least in part on a series of the captured images, if the cornea is moving in a saccadic motion or is moving substantially continuously. Such determination may be performed by, for example, tracking gaze direction of the eye, which may result in traces such as 604, 608, and 612 in FIG. 6. Tracking gaze direction may allow for determination about whether the eye is experiencing saccadic motion or a smooth motion. For example, if a series of measurements of gaze direction of an eye as measured over a period of time include relatively rapid (e.g., with respect to an image on a display) and/or relatively many changes, then the eye is likely experiencing saccadic motion. Such a series of gaze direction measurements may be quantified, for example, and compared to empirical data that describes saccadic motion, continuous and smooth motion, and other motion types At block 906, processor(s) 104 (e.g., utilizing other portions of system 100) may adjust durations of display frames displayed on the display device based, at least in part, on whether the cornea is moving in the saccadic motion or moving substantially continuously.

EXAMPLE CLAUSES

A. A system comprising: a light emitter to emit light toward an eye of a subject; a camera to capture images of a cornea of the eye having glints produced by reflection of the light from the cornea; a display device operated by a display module to sequentially display image frames; and a processor to: determine, based at least in part on a first captured image of the cornea, first locations of the glints at a first time while the display device is displaying an image frame; determine, based at least in part on a second captured image of the cornea, second locations of the glints at a second time while the display is displaying the image frame; determine a retinal velocity of the eye corresponding to differences between the first locations of the glints and the second locations of the glints; and provide signals to the display module to change a display time for the image frame based, at least in part, on the retinal velocity.

B. The system as paragraph A recites, further comprising: an image processor module accessible by the processor to determine the first locations of the glints in the first captured image and the second locations of the glints in the second captured image.

C. The system as paragraph A recites, wherein if the retinal velocity is greater than a threshold value, the processor is configured to: determine, based at least in part on additional captured images of the cornea, additional sets of locations of the glints at corresponding additional times while the display is displaying the image frame; determine additional retinal velocities corresponding to differences among the additional sets of locations of the glints; and provide signals to the display module to extend the display time for the image frame if the additional retinal velocities are greater than the threshold values or terminate displaying the image frame if the additional retinal velocities are less than the threshold values.

D. The system as paragraph C recites, wherein the processor is configured to determine, based at least in part on the additional sets of locations of the glints, if corneal movement of the eye comprises saccadic motions, and wherein if the eye comprises the saccadic motions, the processor increases a frequency of images that are captured by the camera.

E. The system as paragraph A recites, further comprising a timing module accessible by the processor to operate the camera to capture the images of the cornea at a frequency that is based, at least in part, on the retinal velocity.

F. The system as paragraph A recites, wherein the image frame comprises a color frame of a color-sequential image.

G. The system as paragraph A recites, wherein the light emitter is configured to emit two or more beams of the light from different respective directions toward the eye of the subject H. The system as paragraph A recites, wherein the system comprises a head-mounted display.

I. The system as paragraph A recites, wherein the glints comprise specularly reflected light originating from the light emitter.

J. The system as paragraph A recites, wherein the system comprises a virtual reality system.

K. A head-mounted device comprising: multiple light emitters configured to direct infrared light toward an eye of a wearer of the head-mounted device; a camera configured to capture images of a cornea of an eye of the wearer; and a processor to: determine relative positions of glints on the cornea in images captured by the camera; determine retinal velocity of the eye based, at least in part, on the relative positions of the glints on the cornea; and modify display times of image frames based, at least in part, on the retinal velocity.

L. The head-mounted device as paragraph K recites, wherein the processor is configured to determine, based at least in part on gaze direction and a location of an object in the image frames, if the eye is moving in a saccadic motion or if the eye is substantially tracking the location of the object, and wherein if the eye comprises the saccadic motion, the processor increases a frequency of images that are captured by the camera.

M. The head-mounted device as paragraph L recites, wherein the object is a synthetic object of a virtual reality scene.

N. The head-mounted device as paragraph K recites, wherein the multiple light emitters and the camera are positioned relative to one another so that light from the multiple light emitters reflects from the cornea of the eye and enters an aperture of the camera.

O. The head-mounted device as paragraph K recites, wherein relative positions of the glints in the images depend, at least in part, on rotational orientation of the eye.

P. A method comprising: capturing images of a cornea of an eye of a subject while the subject gazes at a display device, wherein the images include sets of glint points on the cornea produced by specular reflection of light by a surface of the cornea; determining, based at least in part on a series of the images, if the cornea is moving in a saccadic motion or is moving substantially continuously; and adjusting durations of image frames displayed on the display device based, at least in part, on whether the cornea is moving in the saccadic motion or moving substantially continuously.

Q. The method as paragraph P recites, wherein the image frames displayed on the display device comprise color-sequential images.

R. The method as paragraph P recites, further comprising: recording to a memory device motions of the cornea with respect to a location of an object in the image frames.

S. The method as paragraph R recites, wherein the object is a synthetic object of a virtual reality scene displayed on the display device.

T. The method as paragraph P recites, wherein the light comprises infrared light.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
    a light emitter to emit light toward an eye of a subject, the eye having a retina and a cornea;
    a camera to capture images of the cornea of the eye having glints produced by reflection of the light from the cornea;
    a display device operated by a display module to sequentially display image frames; and
    a processor to:
        determine, based at least in part on a first captured image of the cornea, first locations of the glints at a first time, while the display device is displaying an image frame, and a first gaze direction, and generate a first virtual cornea sphere based on the first locations, with the first virtual cornea sphere having a first center;
        determine, based at least in part on a second captured image of the cornea, second locations of the glints at a second time, while the display device is displaying the image frame, and a second gaze direction, and generate a second virtual cornea sphere based on the second locations, with the second virtual cornea sphere having a second center;
        generate a virtual sphere having a center, using the first and second centers;
        determine a retinal velocity of the eye corresponding to differences between the first gaze direction and the second gaze direction, the determined retinal velocity being velocity of the image frame projected onto the retina, measured in a retinal coordinate frame using the center of the virtual sphere; and
        provide signals to the display module to change a display time for the image frame based, at least in part, on the retinal velocity.

2. The system of claim 1, further comprising:
    an image processor module accessible by the processor to determine the first locations of the glints in the first captured image and the second locations of the glints in the second captured image.

3. The system of claim 1, wherein if the retinal velocity is greater than a threshold value, the processor is configured to:
determine, based at least in part on additional captured images of the cornea, additional sets of locations of the glints at corresponding additional times while the display is displaying the image frame;
determine additional retinal velocities corresponding to differences among the additional sets of locations of the glints; and
provide signals to the display module to extend the display time for the image frame if the additional retinal velocities are greater than the threshold value or terminate displaying the image frame if the additional retinal velocities are less than the threshold value.

4. The system of claim 3, wherein the processor is configured to determine, based at least in part on the additional sets of locations of the glints, if cortical movement of the eye comprises saccadic motions, and wherein if the eye comprises the saccadic motions, the processor increases a frequency of images that are captured by the camera.

5. The system of claim 1, further comprising instructions stored in memory accessible by the processor to operate the camera to capture the images of the cornea at a frequency that is based, at least in part, on the retinal velocity.

6. The system of claim 1, wherein the image frame comprises a color frame of a color-sequential image.

7. The system of claim 1, wherein the light emitter is configured to emit two or more beams of the light from different respective directions toward the eye of the subject.

8. The system of claim 1, wherein the system comprises a head-mounted display.

9. The system of claim 1, wherein the glints comprise specularly reflected originating from the light emitter.

10. The system of claim 1, wherein the system comprises a virtual reality system.

11. A head-mounted device comprising:
multiple light emitters configured to direct infrared light toward an eye of a wearer of the head-mounted device, the eye having a retina and a cornea;
a camera configured to capture images of the cornea of an eye of the wearer with respect to image frames displayed to the eye; and
a processor to:
determine relative positions of glints on the cornea in images captured by the camera for an image frame of the image frames;
determine multiple gaze directions and multiple virtual cornea spheres, based at least in part on the relative positions of glints, with each virtual cornea sphere having a center and with each gaze direction and each virtual cornea sphere corresponding to a time different from times corresponding to the other gaze directions and other virtual cornea sphere;
generate a virtual sphere having a center of the virtual sphere, using the centers of the virtual cornea spheres;
determine retinal velocity of the eye based, at least in part, on the gaze directions associated with the relative positions of the glints on the cornea, the determined retinal velocity being velocity of the image frame projected onto the retina, measured in a retinal coordinate frame, using the center of the virtual sphere; and
modify display times of image frames based, at least in part, on the retinal velocity.

12. The head-mounted device of claim 11, wherein the processor is configured to determine, based at least in part on gaze direction and a location of an object in the image frames, if the eye is moving in a saccadic motion or if the eye is substantially tracking the location of the object, and wherein if the eye comprises the saccadic motion, the processor increases a frequency of images that are captured by the camera.

13. The head-mounted device of claim 12, wherein the object is a synthetic object of a virtual reality scene.

14. The head-mounted device of claim 11, wherein the multiple light emitters and the camera are positioned relative to one another so that light from the multiple light emitters reflects from the cornea of the eye and enters an aperture of the camera.

15. The head-mounted device of claim 11, wherein relative positions of the glints in the images depend, at least in part, on rotational orientation of the eye.

16. A method comprising:
capturing images of a cornea of an eye of a subject while the subject gazes at a display device, wherein the images include sets of glint points on the cornea produced by specular reflection of light by a surface of the cornea;
determining, based at least in part on a series of the images, if the cornea is moving in a saccadic motion or is moving substantially continuously; and
adjusting durations of image frames displayed on the display device based, at least in part, on whether the cornea is moving in the saccadic motion or moving substantially continuously using a retinal velocity of the eye determined from gaze directions and a center of a virtual sphere calculated from generation of virtual cornea spheres associated with relative positions of the glints captured with respect to an image frame of the image frames displayed, the determined retinal velocity being velocity of the image frame projected onto a retina of the eye, measured in a retinal coordinate frame using the center of the virtual sphere.

17. The method of claim 16, wherein the image frames displayed on the display device comprise color-sequential images.

18. The method of claim 16, further comprising:
recording to a memory device motions of the cornea with respect to a location of an object in the image frames.

19. The method of claim 18, wherein the object is a synthetic object of a virtual reality scene displayed on the display device.

20. The method of claim 16, wherein the light comprises infrared light.

* * * * *